(No Model.) 2 Sheets—Sheet 1.

W. W. KNIGHT.
CLAMP FOR STOPPING LEAKS AND BURSTS IN PIPES.

No. 334,873. Patented Jan. 26, 1886.

WITNESSES:
Donn Turtchell
C. Sedgwick

INVENTOR:
W. W. Knight
BY Munn & Co
ATTORNEYS.

(No Model.) 2 Sheets—Sheet 2.

W. W. KNIGHT.
CLAMP FOR STOPPING LEAKS AND BURSTS IN PIPES.

No. 334,873. Patented Jan. 26, 1886.

WITNESSES: Donn Twitchell. C. Sedgwick.

INVENTOR: W. W. Knight BY Munn & Co. ATTORNEYS.

UNITED STATES PATENT OFFICE.

WILLIAM W. KNIGHT, OF JERSEY CITY, NEW JERSEY.

CLAMP FOR STOPPING LEAKS AND BURSTS IN PIPES.

SPECIFICATION forming part of Letters Patent No. 334,873, dated January 26, 1886.

Application filed December 9, 1885. Serial No. 185,135. (No model.)

*To all whom it may concern:*

Be it known that I, WILLIAM W. KNIGHT, of Jersey City, in the county of Hudson and State of New Jersey, have invented certain new and useful Improvements in Clamps for Stopping Leaks and Bursts in Pipes, of which the following is a full, clear, and exact description.

Reference is to be had to the accompanying drawings, forming part of this specification, in which similar letters of reference indicate corresponding parts in all the figures.

Figure 1:
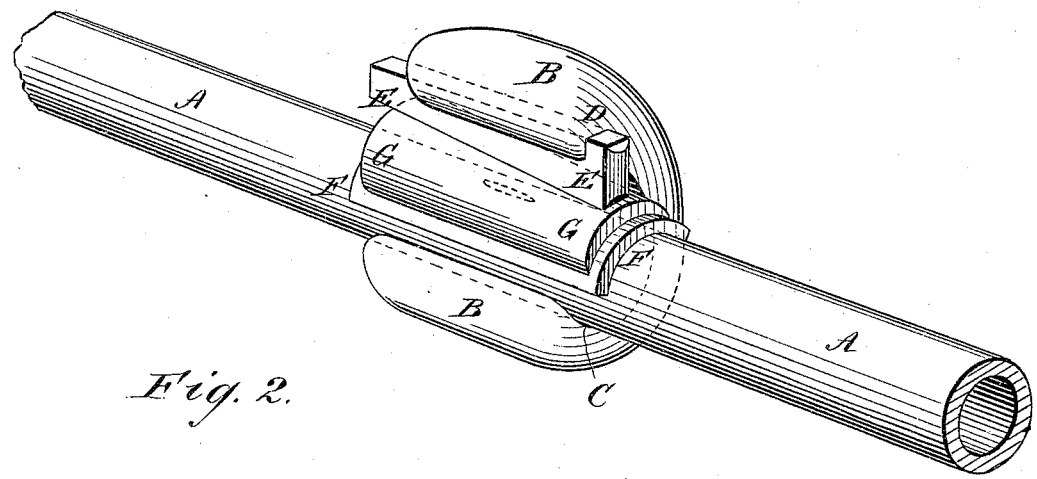
Figure 2:
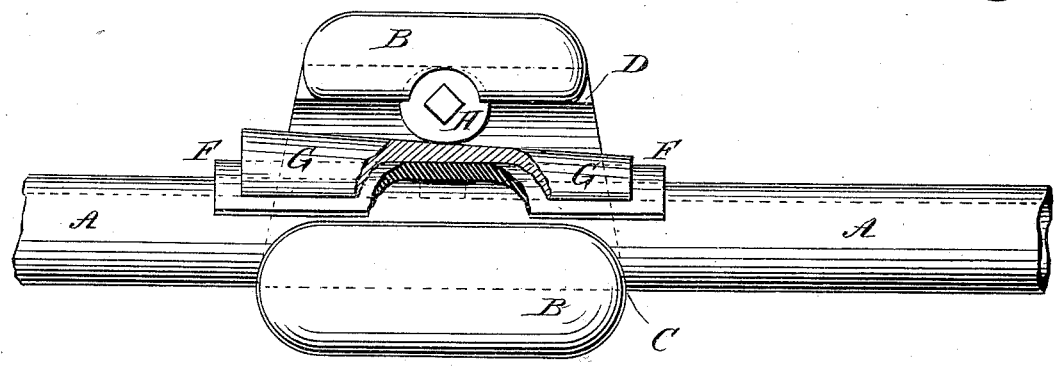
Figure 3:
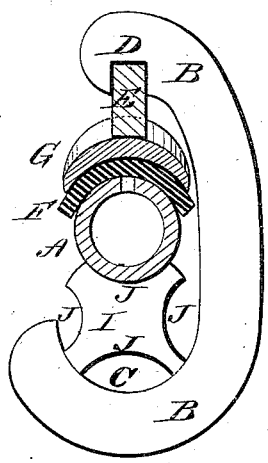
Figure 4:
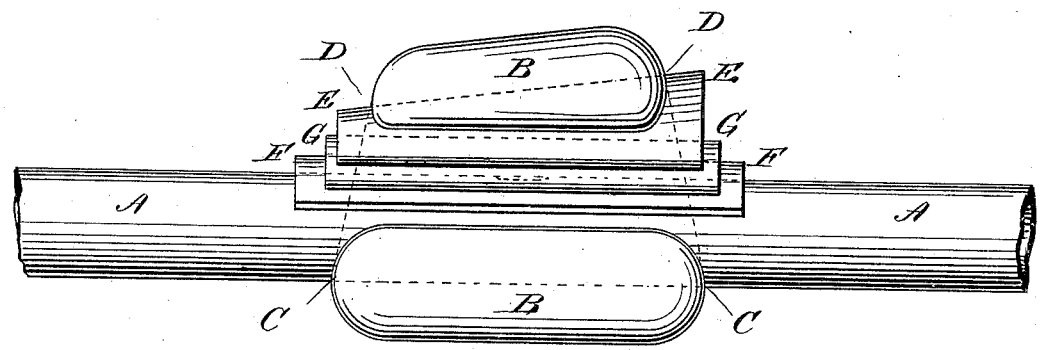
Figure 5:
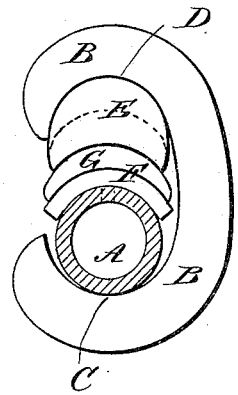

Figure 1 is a perspective view of my improved clamp, shown as applied to a pipe. Fig. 2 is a front elevation of the same, part of the pad and saddle being broken away, and showing a modification of the fastening mechanism. Fig. 3 is a side elevation of the same, the pipe, pad, saddle, and key being shown in section, and showing a horse for carrying the pipe. Fig. 4 is a front elevation of my improvement, showing a modification. Fig. 5 is an end elevation of the same.

The object of this invention is to provide clamps for stopping leaks and bursts in pipes for conducting water, steam, gas, and other fluids, and which shall be simple in construction, convenient in use, and reliable in operation.

The invention consists in the construction and combination of the various parts of the clamp, as will be hereinafter fully described.

A represents a pipe for conducting water, steam, gas, and other fluids. B is a clamp, which has an opening in one side of sufficient size to allow the said clamp to be readily placed upon a pipe, A. In the interior of the clamp B, at one side of the side opening, is formed a recess, C, to receive and fit upon the side of the pipe A. In the interior of the clamp B, at the other side of the side opening is formed a groove or recess, D, to receive a key, E.

In using the clamp, the clamp B is placed upon the pipe A, with the recess C upon the side of the said pipe opposite the aperture to be closed.

A pad, F, of leather, copper, or other suitable material, is placed upon the pipe A, over the aperture, a saddle, G, having its inner side concaved to correspond with the curvature of the outside of the pipe A, is placed upon the pad F, and the key E is driven into the groove D along the outside of the saddle G. The saddle G and the key E are tapered in opposite directions, as shown in Fig. 1, so that the saddle G and pad F will be forced down squarely upon the pipe A by driving the key E into the groove D, and the aperture in the pipe A will be securely closed.

If desired, the saddle G and pad F can be forced down upon the pipe A by an eccentric, H, journaled to the clamp B, and having the end of its journal squared to receive a key for operating the said eccentric, as illustrated in Fig. 2.

The clamps B can be widened, and a horse, I, placed in the recess C, to rest against the pipe A. In this case the sides of the horse I should be made with recesses J upon the arcs of circles of different sizes, as shown in Fig. 3, so that the said saddle can be adjusted to fit against pipes of different diameters.

If desired, the saddle G can be made without taper, and the key E made concave upon the inner side and convex upon the outer side, and tapered, as shown in Figs. 4 and 5. In this case the groove D, into which the key E fits, should be concave and tapered, as indicated in Figs. 4 and 5.

With this clamp a leak or burst in a pipe can be easily and securely closed, until such time as it may be convenient to have the pipe repaired.

Having thus described my invention, what I claim as new, and desire to secure by Letters Patent, is—

1. In a clamp for pipes, the combination, with the clamp B, having a side opening and interior recesses, C D, at the opposite sides of the said side opening, the pad F, and the concaved saddle G, of the key E, substantially as herein shown and described, whereby the said pad and saddle can be readily forced down upon a pipe and held in place, as set forth.

2. In a clamp for pipes, the combination, with the clamp B, the pad F, the saddle G, and the key E, of the horse I, having concaved recesses of different arcs in its sides, substantially as herein shown and described, whereby the clamp can be applied to pipes of different sizes, as set forth.

WILLIAM W. KNIGHT.

Witnesses:
JAMES T. GRAHAM,
C. SEDGWICK.